H. CHARLES, Jr.
Potato-Bug Gatherer.
No. 196,876. Patented Nov. 6, 1877.
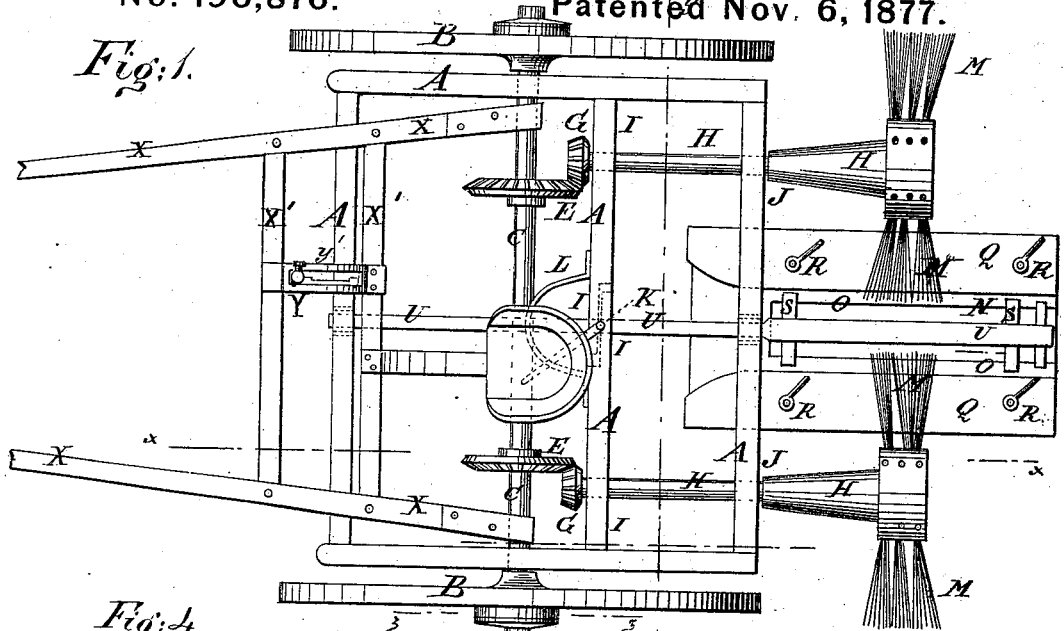
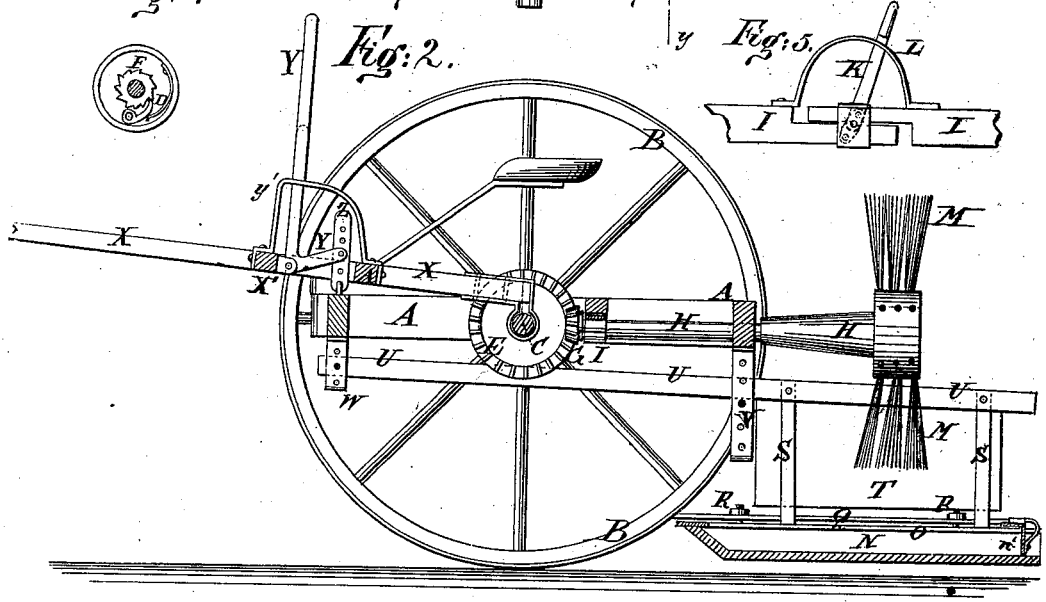
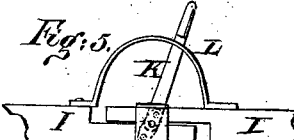
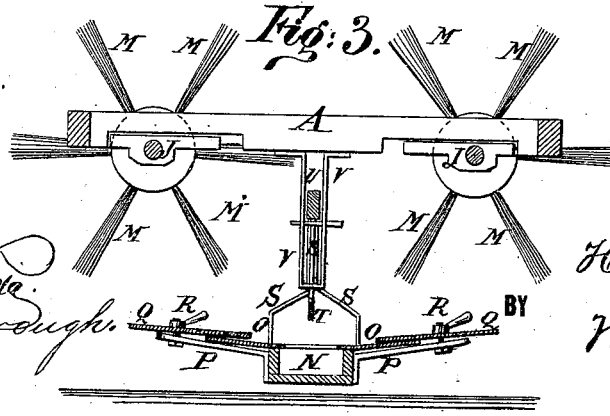
WITNESSES:
INVENTOR:
H. Charles Jr.
BY
ATTORNEYS.

UNITED STATES PATENT OFFICE.

HOMER CHARLES, JR., OF EAST JAVA, NEW YORK.

IMPROVEMENT IN POTATO-BUG GATHERERS.

Specification forming part of Letters Patent No. 196,876, dated November 6, 1877; application filed April 23, 1877.

*To all whom it may concern:*

Be it known that I, HOMER CHARLES, Jr., of East Java, in the county of Wyoming and State of New York, have invented a new and useful Improvement in Machine for Gathering Potato-Bugs, of which the following is a specification:

Figure 1 is a top view of my improved machine. Fig. 2 is a vertical longitudinal section of the same, taken through the line $x\ x$, Fig. 1. Fig. 3 is a vertical cross-section of the same, taken through the line $y\ y$, Fig. 1. Fig. 4 is a detail cross-section of one of the hubs, taken through the line $z\ z$, Fig. 1. Fig. 5 is a detail under-side view of the device for throwing the machine into and out of gear.

Similar letters of reference indicate corresponding parts.

The object of this invention is to furnish an improved machine which shall be so constructed that when drawn through the field it will sweep the bugs from the vines and catch them in a pan or box, from which they may be taken and destroyed, and which shall be simple in construction and convenient in use.

The invention will first be described in connection with the drawing, and then pointed out in the claim.

B B are the wheels, which are placed upon the journals of the axle C, and the hubs of which are chambered to receive the pawls D and ratchet-wheels F, by which they are made to carry the said axle with them when turned forward, and are allowed to turn back without turning the said axle. This construction enables the machine to be easily turned at the ends of the rows. The axle C revolves in bearings attached to the side bars of the frame A.

To the axle C, near its ends, are attached two large bevel-gear wheels, E, into the teeth of which mesh the teeth of the small gear-wheels G, attached to the forward ends of the shafts H. The shafts H revolve in bearings I J, attached to the middle and rear cross-bars of the frame A. The forward bearings I of the shafts H, or the bars to which said bearings are attached, are made long, and are slotted at their outer ends to receive the bolts by which they are secured to the bar of the frame A. The inner ends of the bearings or bars I are halved to each other, pass through a keeper attached to the bar of the frame A, and have holes or notches formed in the inner sides of their overlapped parts to receive pins or a cross-head attached to the lower end of the lever K, so that the gear-wheels G may be thrown into and out of gear with the gear-wheels E by operating the said lever K. The upper part of the lever K is bent forward at right angles, and passes through the slot of a curved bar, L, attached to a cross-bar of the frame A, and notched to receive the said lever K and hold it in either position. The rear bearings J of the shafts H are slotted longitudinally to receive the bolts that secure them to the rear cross-bar of the frame A, so that the rear ends of the said shafts H may be adjusted wider apart or closer together, as the width of the rows may require.

M represents brushes, attached to the rear ends of the shafts H, to sweep the bugs from the potato-vines into a tray or trough, N, and which I prefer to make of broom-corn, as it will sweep all the bugs off the vines, and will not injure the said vines. The tray N is made with its forward end inclined or beveled upon the lower side, so that it may readily pass over obstructions, and its rear end is closed with a slide, $n'$, for convenience in removing the bugs to destroy them.

To the top edges of the sides of the tray N are attached plates O, which are slightly inclined inward, and the inner edges of which project a little over the interior of the said tray N, to prevent the bugs from crawling out. The plates O are supported by brackets P, attached to the sides of the tray N, and the arms of which project beyond the outer edges of the plates O, and are slotted to receive the bolts R, by which the plates Q, that overlap the outer parts of the plates O, are secured in place, so that the table O Q of the tray N may be expanded or contracted, as the width of the rows may require.

The tray N is attached to the lower ends of the arms or braces S, to which arms or braces is attached a vertical plate, T, to prevent the bugs from being thrown over the tray N by the action of the brushes, and to cause them to drop into the said tray. The upper ends of the arms S are attached to the rear part of the bar or lever U, which passes through the long keepers or loops V W, attached to the front and rear bars of the frame A. The forward keeper or loop W has a number of holes formed through it to receive the pin by which the forward end of the bar or lever U is pivoted to the said keeper, so that, by adjusting the said pin, the tray N may be adjusted to work at any desired distance from the ground. The rear keeper V has a number of holes formed through it to receive a pin, upon which the bar or lever U rests, to limit the downward movement of the tray N, while allowing it to rise freely to pass over obstructions.

X X are the thills, which are connected by two cross-bars, $x'$, and to the rear ends of which are attached bearings, in which the axle C revolves, and by which the said thills are pivoted to the said axle. To the forward cross-bar $x'$ of the thills X is pivoted the angle-lever Y at its angle. The lower or short arm of the lever Y is pivoted to the bar Z, the lower end of which is pivoted to the forward cross-bar of the frame A, so that by operating the said lever Y the frame A may be turned upon the axle C, to raise the tray N away from the ground. Several holes are formed in the pivoted bar Z, to receive the pivoting-pin, so that the said bar Z may be adjusted to raise the tray N to a greater or less distance from the ground. The upper or long arm of the lever Y passes through the slot of a curved bar, $y'$, attached to the cross-bars $x'$ of the thills X, and in which is formed a notch to fasten the said lever when holding the tray raised from the ground.

Having thus described my invention, I claim as new and desire to secure by Letters Patent—

The combination, in a potato-bug gatherer, with a partition arranged above the pans, of the braces mortised through projections, as and for the purpose specified.

HOMER CHARLES, JR.

Witnesses:
ULYSSES FITZMAURICE,
PHILO W. POTTER.